United States Patent Office 3,654,092
Patented Apr. 4, 1972

3,654,092
MULTIPLE-STAGE EVAPORATOR
John C. St. Clair, Box 333, R.R. 2, London, Ohio 43140
Filed Nov. 20, 1970, Ser. No. 91,511
Int. Cl. B01d 1/02, 1/26, 3/00
U.S. Cl. 202—174
10 Claims

ABSTRACT OF THE DISCLOSURE

A twenty-stage vacuum evaporator is made from a series of 20 sloping sheets of polyester plastic film separated by 0.5 inch diameter pebbles. The plastic sheets of film slope at a 15° angle and are supported 8 inches apart by and in a bed of the pebbles. Pumps circulate the liquid solution evaporated over the upper surfaces of the plastic sheets of film and the liquid is evaporated by vapors contacting and condensing on the under surfaces of the plastic sheets, with each sheet dividing off a chamber that evaporates liquid at a successive lower pressure. Condensate formed by the vapors condensing on the underside of the plastic sheets is prevented from mixing with the liquid solution being evaporated by a series of short plastic sheets, placed at a smaller angle with the horizontal than the larger sheets, that catch the condensate like shingles on a house and direct the condensate into bottom outlets.

---

Men have used the process of evaporation for over 4000 years but in spite of much study and many improvements there is much to be desired with the art of evaporation. For instance there are many processes that would become very advantageous if there were cheaper methods for evaporation. For instance pure water could be widely obtained from sea water if there were cheaper evaporation methods. For instance the separation process of chromatography is very good for separating plastics by adsorption into superior plastics or for separating a large number of plastics, mixed all together with trash, that can be very profitably reused. However chromatography produces the final separated plastics in a number of separate fractions all dissolved as only roughly 0.5% solutions in volatile solvents. The cost of evaporating these solvents from the separated plastics makes impractical the otherwise use of chromatography for recovering the enormous amount of plastics that are normally buried or burnt at city dumps. Transporting, by pipe line, coal as a slurry in viscous hydrocarbon oils would allow coal to be cheaply transported to its final destination where it could be converted into synthetic natural gas which must be made out of the larger particles of coal that only can be transported cheaply by pipe line in a viscous oil. The viscous oil must be removed from the coal and then piped back to the coal mine for reuse. However this requires washing the coal with a volatile hydrocarbon and the cost of evaporating the volatile hydrocarbon off from the viscous oil is excessive.

In the disclosed invention an evaporator is shown that costs only a fraction of the cost to construct of prior evaporators and requires only a fraction of the previously required heat for operation. It is submitted that this new evaporator will make practical the processes described in the preceding paragraph.

Figure 1:
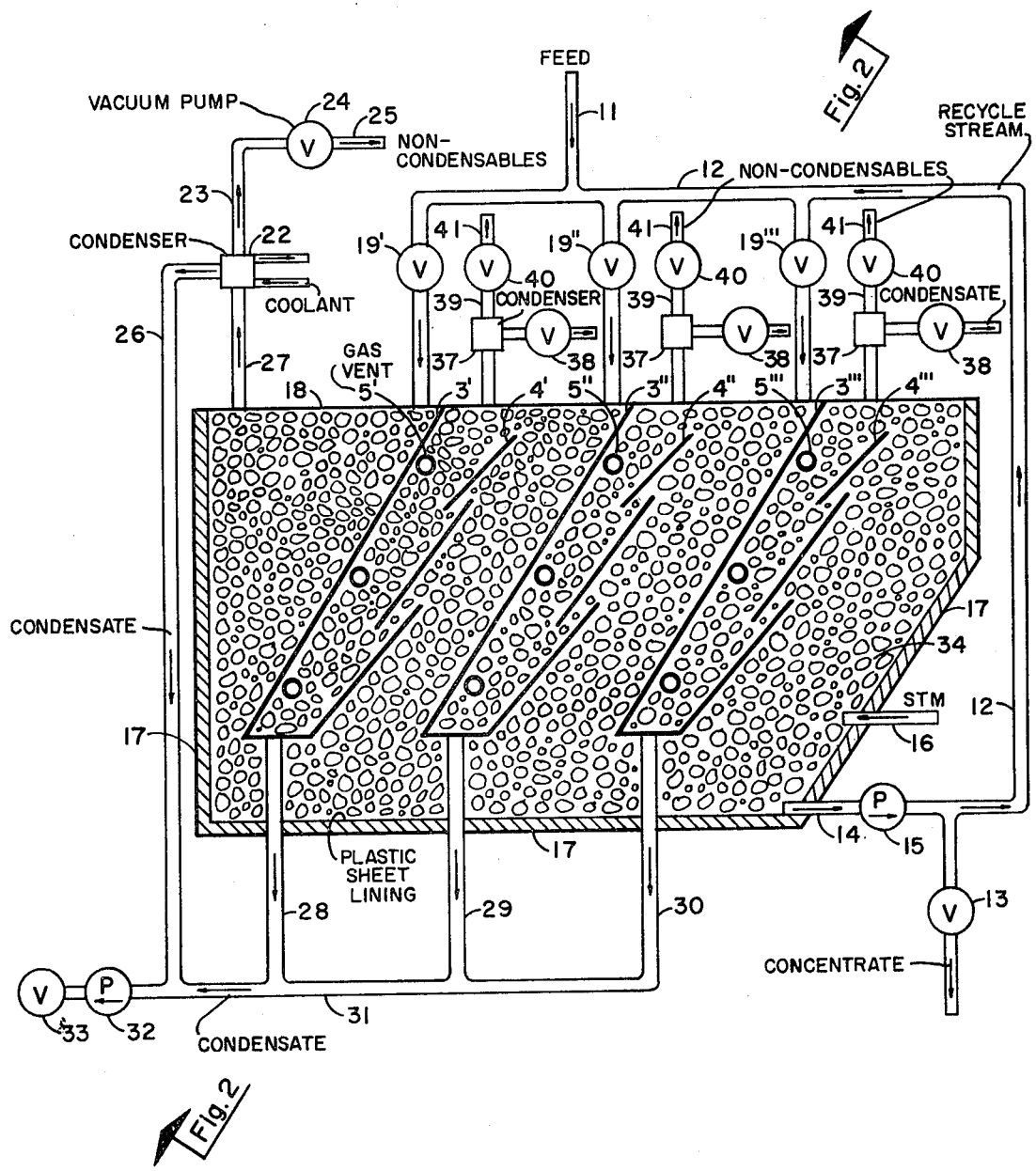

FIG. 1 of the drawing shows a cross sectional view of one form of the evaporator.

Figure 2:
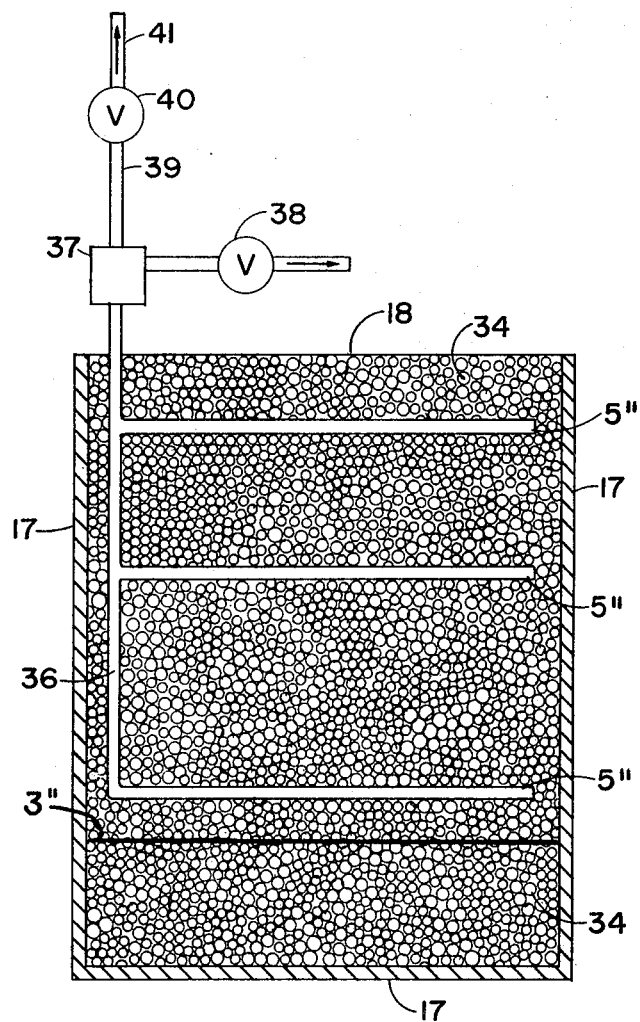

FIG. 2 of the drawing shows an angular cross sectional view, of FIG. 1, that shows specifically vent outlet pipes of part of the evaporator.

In FIG. 1 is shown an outer vessel at 17. This vessel may be of metal construction but for large evaporators is normally made with earth side walls and bottom which are lined with plastic sheets. The top of vessel 17 is covered by plastic sheet 18.

Water feed solution that is to be concentrated by evaporation enters by pipe line 11 and passes to pipe line 12. Here the feed liquid joins partially concentrated feed liquid and the two liquid streams are divided and pass by valved pipe lines 19', 19'', and 19''' into the top of vessel 17. The liquids from valved pipe lines 19', 19'', and 19''' pass onto sheets 3', 3'', and 3''' respectively. On all three sheets the liquid flows down its respective sheet and is heated and evaporates because of vapors condensing on the underside of the sheet.

It is the essence of this invention that the sheets in the evaporator are supported and held in place by placing them in a gas permeable mass of solid particles such as in a bed of pebbles. It is not important what size the pebbles are or what material they are made out of as long as they are not dissolved by the feed liquid being evaporated and as long as they are not of a size or have sharp corners that pierce thin plastic film when thin plastic film is used for the sheets.

Normally when water solutions are evaporated I prefer to use 0.5 inch diameter pebbles for the pebbles that touch the various sheets in the evaporator. This is a convenient size that will not unduly hold water, because of surface tension, in the voids of a bed of such pebbles. For organic solvent solutions, consideration may be taken of their lower surface tensions and pebbles as small as 0.2 inch in diameter may be used. Of course larger pebbles may always be used where the pebbles do not touch the sheets. In this case large pebbles only have the disadvantage that they make it more difficult sometimes to put the sheets that are buried in them close together in predetermined positions. That is large pebbles are hard to smooth up into a flat surface.

The sheets resist the load of pebbles on them by two different methods. For metal sheets and for polyester sheets the load is resisted by the high strength of these materials. However for elastomer sheets (rubbers sheets and other rubber-like materials like highly extensible polyethylene and polypropylene sheets that elongate large percentages of their initial lengths under tension) the load of the pebbles is resisted by the sheet bending and transferring the load on it directly to the pebbles underneath.

In case metal sheets, like those of iron, or aluminum, are used the pebbles may have sharp corners. However in case of plastic sheets sharp corners may pierce the sheets. As a result, in this latter case, pebbles that have their sharp corners knocked off are greatly preferred. Such pebbles are very commonly found where flowing water has deposited pebbles. However, if desired, rounded pebbles may be made by processes similar to grinding in a ball mill. That is a barrel half full of pebbles is slowly revolved and the contact of the pebbles moving against each other will knock the corners off.

A large range of materials may be used for making the subdivided particles used and what is normally preferred is normally that which is locally convenient. As for example around a Southern United States paper mill, where it is desired to evaporate the dilute waste water solutions that normally must be at least finally dumped in some stream and cause more or less water pollution, stone pebbles may not be available locally. In this case waste wood or bark can be broken up to form substitutes for stone pebbles. In other localities metal turnings from the shaping of metal by lathes make a cheap and very satisfactory substituted for stone pebbles. Some clays when moistened and dried become quite hard and for the evaporation of most organic liquids can be satisfactorily substituted for regular stone pebbles. Waste trash materials like old bottles and tin cans when broken up can serve in place of regular stone pebbles. However pebbles made out of stone are normally the most convenient. Stone is defined as "concreted earthy or mineral matter," where "concreted" is defined as "united in a solid form." "Earthy or mineral matter" is defined as that which naturally and permanently occurs in the ground.

As for the thickness of the sheets that may be used it is emphasized that while the ability to use thin cheap sheets is the biggest advantage of my invention, my invention also has the other large advantage of providing a method where power may be used in an evaporation with unusually high efficiency to increase the effectiveness of heat transfer surfaces used. And also my evaporator provides an unusually effective method for removing drops entrained in the vapors which makes my evaporator unusually good for accomplishing evaporations where the condensate must be extremely pure and where evaporations must be carried out under high vacuum. (This is described in detail below.) Therefore it is possible to use steel sheets with the metal 0.5 inch thick, which thickness is completely unnecessary, and obtain performance better in many cases to prior apparatus. Therefore I define sheets in this patent as any material that is less than 0.25 inch thick.

As previously stated, water feed solution that it is desired to evaporate flows down sheet 3''' and is evaporated by vapors condensing on the underside. These vapors, which in the drawing are made of steam entering at 16, pass through the pebbles 34 in the container 17 and through the shingle-like arrangement of smaller sheets, the top one of which is given the numeral 4''', and condense on the underside of sheet 3'''. There will of course be traces of noncondensible gases in the steam (especially when the evaporator is being started up) and these are shown as being taken off by three vent outlets under sheet 3''', the upper of the three vent outlets in FIG. 1 being shown given the numeral 5'''. These vent outlet pipes are usually made of horizontally placed plastic or metal pipe with holes drilled in their undersides to allow noncondensible gases to be drawn off. An angular cross section of the evaporator is shown in FIG. 2 in which three vent outlet pipes marked as 5''' join onto a common header, pipe line 36, which passes the gases to vent condenser 37 which condenses the water vapor out before the noncondensible gases pass by pipe line 39 and vacuum pump 40 and pipe line 41 out of the system. The condensate is removed by valved pipe line 38 and is combined with the rest of the condensate from the evaporator.

The shingle-like arrangement of two short sheets underneath sheet 3''' (the upper one of which two short sheets is given the numeral 4''') serve to direct the condensate forming from vapors condensing on the underside of sheet 3''' into a turned-up bottom section of sheet 3'''. This forces the condensate to flow through pipe line 30 and pipe line 31 to pump 32 that pumps the water condensate out of the system by valved pipe line 33.

Excess liquid that passes down the upper side of sheet 3''', and is not evaporated, passes into the bottom of the apparatus below the sheets shown and flows through pebbles placed in the bottom of vessel 17 to pipe line 14. There it is pumped by pump 15 through pipe line 12 partially back to the top of the apparatus for recycling over the sheets 3', 3'', and 3''' and partially flows by pipe line 12 to valved pipe line 13 which takes part of the liquid as the concentrated final product.

The evaporation of the water solution on sloping sheet 3'' is identical to that described for sheet 3'''. Vapors from the upper side of sheet 3''' pass through the pebbles and openings in the shingle-like arrangement of short sheets just above sheet 3''' (the upper of the short sheets is given the numeral 4'' in FIG. 1) and condense on the bottom of sheet 3''. Noncondensible gases pass out by three vent outlet pipes, the upper one of which is given the numeral 5'' in FIG. 1, which are identical in construction and final disposal of these gases as previously described for vent outlets 5''' for the vent outlets under sheet 3''' as shown and previously described in FIG. 2. Condensate flows over the shingle-like arrangement of short sheets (of which the upper short sheet is given the numeral 4'') and is forced into a bottom section of sheet 3'' that has been turned up. This forces this condensate to flow through pipe line 29 and pipe line 31 to pump 32 which pumps the water condensate out of the system. Water solution from valved pipe line 19'' flows over the upperside of sheet 3'' and is evaporated, the unevaporated part flowing into the bottom part of vessel 17. There between the pebbles it flows to pipe line 14 where it passes to pump 15 which pumps the liquid through pipe line 12 to the top of vessel 17 for recycling over the sheets 3', 3'', and 3'''.

The evaporation of the water solution on sloping sheet 3' is similar to that shown for sloping sheets 3'' and 3'''. Vapors from the upper side of sheet 3'' pass through the pebbles and openings in the shingle-like arrangement of short sheets just above sheet 3'' (the upper of the short sheets is given the numeral 4' in FIG. 1) and condense on the bottom of sheet 3'. Noncondensible gases pass out by three vent outlet pipes, the upper one of which is given the numeral 5' in FIG. 1, which are identical in construction, and final disposal of these gases similar as previously shown for vent outlet pipes 5''' for the vent outlet pipes under sheet 3''' as shown in FIG. 2. Condensate flows over the shingle-like arrangement of short sheets under sheet 3' (the upper of these short sheets is given the numeral 4' in FIG. 1) and is forced into a bottom section of sheet 3' that has been turned up. This forces condensation to flow by pipe line 28 and pipe line 31 to pump 32 which pumps the condensate out of the system by valved pipe line 33. Water solution from valved pipe line 19' flows over the upperside of sheet 3' and is evaporated, the unevaporated part flowing into the bottom part of vessel 17. There between the pebbles it flows to pipe line 14 where it passes to pump 15 which pumps the liquid through pipe line 12 to the top of vessel 17 for recycling over the sheets 3', 3'', and 3'''.

Vapors evaporated from sloping sheet 3' pass through the pebbles to pipe line 27 where they pass to condenser 22 which condenses them. The noncondensible gases pass by pipe line 23, vacuum pump 24, and pipe line 25 out of the system. The water condensate passes by pipe line 26 to pump 32 where it is pumped out of the system by pump 32 through valved pipe line 33.

It is emphasized that the disclosed very cheap construction that permits temperature differentials across heat transfer, or evaporating, surfaces as low as 1.0° Fahrenheit and permits the operation at temperatures only slightly above room temperatures for water under the resulting vacuum, leakage of vapors between successive effects of the evaporator and direct mixing of streams of liquids from different effects of the evaporator produce very low overall losses of efficiency. As a result of the drawing it is shown where condensates condensed under sheets 3', 3'' and 3''' are directly mixed without the prior use of heat recovery from these streams to bring them closer together in temperature. This is done since normally the overall temperature difference between these streams will be as small as 5° Fahrenheit. Also excess liquid of streams that have been poured over sheets 3', 3'', and 3''' and has not been evaporated is shown allowed to mix the pebbles in the bottom of vessel 17 and flow together through the pebbles to pipe line 14 to be pumped by pump 15 by pipe line 12 to the top of vessel 17 to be recirculated over the sheets. This is because of the same above reason that there is little temperature difference between these streams. This permits a great reduction in the number of pumps required as compared to that which would be expected. Also steam entering by 16 is allowed to contact the stagnant liquid solution that has been partially concentrated in the apparatus and rests stagnantly between the pebbles in the lower right hand corner of vessel 17 but above the level where liquid is taken off by pipe line 14.

Fabrication of the evaporator is relatively cheap. The evaporator will normally be operated under vacuum and square vessel my be used for vessel 17 with the outside pressure, that presses inwardly on a vessel under vacuum, being supported by the mass of pebbles inside vessel 17. By putting temporary tracks along the two sides, of the evaporator, that are perpendicular to the sheets a light travelling crane can be mounted on the tracks and move over the evaporator under construction. In this way the crane can lower a straight wooden beam that will be used, by the workers filling the evaporator with pebbles and sheets, to keep the positions of the sheets in predetermined places. By proper regulation of the elevation of the straight wooden beam the wooden beam can be used as a scraper to smooth up the surface of a layer of pebbles put in the evaporator.

As long as the sloping sheets are sloped to some degree the liquid being evaporated in the evaporator will flow down the sheets and the evaporator will work. It is to be noted that the flow of most liquids flowing through beds of pebbles under most conditions that would be used is turbulent and the velocity of a liquid under such conditions is only proportional to the square root of the fall of the liquid per foot of horizontal travel. (The presence of turbulence can be predicted and the pressure drop or resistance to flow of liquids through means of pebbles may be very conveniently calculated by use of the method given on page 237 of Absorption and Extraction by Sherwood and Pigford, 2nd edition, 1952, McGraw-Hill Book Co., New York.) It it emphasized that by using the modified Reynolds Number used in this method that equations used for calculating pressure drops for gases can also be used for calculating the pressure drops for liquids. The same method also is very useful for calculating the pressure drop of the vapors in my evaporator through the mass of pebbles. This latter can be of importance when the evaporator is operated under less than 0.1 atmosphere absolute pressure and especially of importance at locations where pebbles are not cheaply obtainable and it is desirable to build the evaporator with as close spacing of the sheets as possible to reduce the volume of pebbles to as small as practical.

It is emphasized that the cost of my evaporator is only from 1% to 10% of the cost of prior evaporators on the basis of cost per square foot of evaporating surface. This is due to the fact that sheets of aluminum and iron cost from 10¢ to 20¢ per square foot and polyester sheet of practical thicknesses of 0.001 to 0.002 inch thick cost from 1.0¢ to 2.5¢ per square foot. Also polyethylene sheets of practical thickness of up to 0.004 inch thick cost under 1.0¢ per square foot. Pebbles cost under 10¢ per cubic foot usually and frequently cost much less.

It was first thought by me that my evaporator would have low rates of heat transfer or evaporation per square foot of heat transfer as compared with prior evaporators operated at the same temperature differential. However I have found that the heat transfer, or evaporation per square foot of surface, is surprisingly high and in some cases even better than that of prior evaporators. This is due to the fact that all heat transfer processes to liquids of practical interest require the application of power in some way to transfer the heat from the surface, that heats the liquid, to the liquid that is being heated and evaporated. In other words the liquid being heated and evaporated must be stirred or mixed. This is usually done by agitation caused by bubbles rising in the liquid. However this has long been recognized as an inefficient method for agitation and for many years forced circulation evaporators, using pumps, have been used in some cases. These forced circulation evaporators have the disadvantage that the liquid must be forced through tubes having an appreciable length, since when fabricating heat transfer apparatus out of tubes it is necessary to use tubes of appreciable length to reduce the cost per square foot of heat transfer area to a bearable level. This means that the liquid will have to be raised in temperature considerably above its boiling point before the liquid is allowed to evaporate and as a result there is a substantial inefficiency due to the liquid, being evaporated, being heated to a higher temperature than necessary before it is allowed to evaporate. (Evaporation inside the tubes of a forced circulation evaporator has the effect of causing a relatively high pressure drop and large power requirements for the pump forcing the liquid through the tubes. Hence it is preferably avoided.) Therefore in my evaporator I have achieved the very desirable result of providing a method of agitating the liquid to which heat is transferred by the process of pouring it in the form of a layer down a sloping surface covered with pebbles that cause turbulence, and at the same time provide the layer of heated liquid with a free surface so that it can evaporate as soon as it is heated.

It is also stressed that my evaporator provides an unusually good method for removing the droplets that normally may form in evaporating a liquid and tend to pass along with the vapors and hence contaminate the condensate of the vapors. This is due to the fact that the area of the droplet disengaging space equals the area of the sheet on which the liquid is evaporated. The old horizontal evaporator that was used for centuries and is now used in many cases only has a small fraction of area, per square foot of heat transfer or evaporating surface, for settling out droplets formed in the vapors evaporated. But of more importance, because of the high cost of the old horizontal evaporator, the old horizontal evaporator has to be operated with high temperature differentials across its heat transfer surfaces (and use expensive heat) and hence has a large vapor out-put per square foot of heat transfer surface. However my evaporator is so cheap per square foot of heat transfer surface that it is normally operated with small temperature differentials across its heat transfer surfaces (and hence use cheap heat) and hence has a much smaller vapor through-put per square foot of heat transfer surface. Therefore considering both factors my evaporator will normally be operated with as low as 1% of the vapor rate in its section where the gas flows and any droplets will have an unusually good opportunity to settle out. This makes my evaporator unusually good at producing condensates contaminated with very little of the nonvolatile salts, etc. of the solution from which it is evaporated. Also my evaporator is unusually good for vacuum evaporations where very frequently entrainment is a very serious problem with prior evaporators.

It is also to be stressed that with previous evaporators that much trouble is caused by even minor corrosive natures of the solutions handled. Solutions like that of common salt in water, which are normally considered to be only slightly corrosive, will corrode the thin metal tube walls in prior evaporators and expensive materials like copper or even nickel and titanium are very frequently required for the evaporator tubes. However with my evaporator I can use plastic sheets for the heat transfer surfaces and plastic pipe for the piping used which do not corrode and as a result the savings of my evaporator evaporating such solutions are even much larger than those I state elsewhere in this patent. It should also be pointed out that, since my evaporator can be operated at much lower pressures and hence much lower temperatures, just the operation at much lower temperatures almost always greatly reduces the rate of corrosion of metals. Therefore my evaporator can use cheaper metals that will last longer even if one desires to use metals in the construction of my evaporator for evaporating corrosive liquids.

It is admitted that if the heat transfer surfaces of my evaporator become fouled it is rarely practical to mechanically clean the fouled surfaces such as is done in the drilling out the tubes of prior evaporators. However, by using plastic sheets for my evaporator's heat transfer surfaces, it is practical to clean out my evaporator with acids and as a result in many cases fouling solutions can be evaporated with much less expense for cleaning than is required for prior evaporators. It is emphasized that calcium sulfate scale, which is the great cause of difficulty to remove scales in the evaporation of water, is quite soluble in warm strong acid solutions. The calcium sulfate can be very easily removed from the warm acid solutions by just cooling the warm acid solution. This permits reuse of the acid solution. Also my evaporator can operate at much lower temperatures than prior evaporators and hence fouling in many cases will be much less. As for example fouling by calcium sulfate is very much less at low temperatures. Also fouling caused by decomposition of organic materials is greately if not completely avoided.

EXAMPLE

The preferred actual design of my evaporator will vary widely with the cost of capital and the cost of heat. But for example when my evaporator is built by and used by a private company that is evaporating a dilute water solution, flow rates of 1000–2000 pounds of the solution evaporated per foot wide of sloping films sloping at a 15° angle are usually preferred. The distance between the sheets on which the liquid solution is evaporated will be about 6 to 8 inches. The pebbles will be 0.5 inch average size. The length of the sloping sheets will be about 80 feet long. With 2° Fahrenheit temperature differentials across polyester film surfaces evaporation rates of over 0.2 pound per hour per square foot of the heat transfer surface can be easily obtained with power rates of under 1 kilowatt hour per 1000 pounds of water evaporated. For a 2-mil thick polyester sheet or a 4-mil thick polyethylene sheet the resistance to the heat transfer of the plastic sheets will be less than 1/6 of the total resistance to heat transfer across the heat transfer surfaces. With organic solvents being evaporated the evaporation rates, for the above conditions, will be over 1.0 pound per hour per square foot of surface. In both cases the evaporation will be carried out under vacuum without the usual expense for heating the liquids evaporated to elevate evaporating temperatures.

A large number of designs may be used to prevent the condensate from mixing with the solution being evaporated, besides the method shown in the drawing. (The method shown in the drawing shows an arrangement like that used for shingles on a house for sheets 4', 4" and 4"' to stop condensate from mixing with the liquid being evaporated.)

For instance if particles in layers one to two feet thick are used between successive layers of sheets, rocks of a diameter of one to six inches can be used except where the particles touch the sheets and pebbles of about 0.5 inch in diameter are normally preferred. In this case the vapors, evaporated, can easily travel from 40 to 80 feet parallel to the sheets, through the beds of pebbles and rocks, before they must be condensed. In cases where there are considerable latitude as to where the multiple-effect evaporator can be located the multiple-effect evaporator can be placed near a convenient source of rock and the cost of the rocks for the centers of the layers of rocks and pebbles between the sheets will be cheap. When a rock formation is convenient that can be ripped by big tractors pulling enormous teeth through the rock formation, broken rock is very cheap.

In the above variation just mentioned the necessary arrangement of a sheet that prevents the condensate condensed on the under side of a sheet like 3', 3" or 3"' in the drawings from mixing with the solution evaporated can be easily provided by a separate very long sheet under and for each sheet 3', 3", or 3"'. The very long sheet would direct the vapors from a sheet, where liquid solution flows over and is being evaporated, to just one opening for the vapor. Such an opening could be located at the top of the evaporator.

Other designs, usually similar to usual roof type construction for buildings, are obvious. An obvious design is to locate the sheets, that prevent the condensate from mixing with the liquid evaporated, like V-crimp roofing is placed on small buildings. V-crimp roofing is made in long pieces usually 2 feet wide that are placed so their length covers a section of a small roof from the ridge to the eaves. On the sides of each piece of V-crimp roofing are V-crimps or ridges stamped into the metal that prevent the rain from flowing sideways from the sheet to under other sheets. In the case of my multiple-effect evaporator sheets similar in construction with V-crimps, or V-crimp resembling construction, on the sides but usually larger in size, would be placed for condensate diversion to desired locations. In this case the vent outlet tubes would be placed parallel to the sloping direction of the V-crimp sheets, whose long direction would be directed sloping downward.

However, though the design of the sheets that prevent mixing of the condensate with the solution being evaporated can be very widely varied, in all cases these sheets are imbedded in, supported by and located between layers of gas and liquid permeable solid particles. The same applies to the sheets that the liquid solution being evaporated flows over and is evaporated on. This is the essence of the invention.

The word "particle" is defined as a solid piece of anything solid.

I claim:

1. A multiple-stage evaporator comprising: sloping sheets of liquid and gas impermeable material spaced in a series of at least 6 sheets and spaced horizontally and substantially parallel at predetermined intervals by a gas and liquid permeable mass of solid particles in which said sloping sheets are imbedded, said particles supporting the sheets and keeping the sheets spaced apart, alternate continuous sheets of said series of sloping sheets forming walls of successive chambers which are provided with gas-removal means to maintain the successive chambers at a decreasing pressures, means for passing a liquid solution over the above mentioned alternate sloping sheets so that liquid solution flows as a layer over the upper sides of the above mentioned alternate sloping sheets, means to supply heating vapors to the underside of the first of said alternate sloping sheet at highest pressure so that heat is transferred through the sheet to the liquid solution flowing on the upper side of said first alternate sheet at highest pressure and causes the liquid solution on its upper side to evaporate and form secondary vapors which pass between the particles and contact the underside of the second alternate sloping sheet acting as a wall of the chamber at next lowest pressure, said secondary vapors heating the last mentioned sloping sheet and evaporating liquid solution flowing over its upper surface and thus providing a multiple use of the original but degenerated heat for evaporating said last mentioned liquid solution, means for condensing the vapors evaporated from the last liquid solution mentioned as evaporating, and, between successive members of the alternate sloping sheets of the series first mentioned, said alternate sloping sheets being sheets on which liquid is evaporated, other sheets that are not continuous but provide openings so that vapors evaporated from the upper side of the first of the continuous and alternate sheets can pass to the underside of the next one of the series of continuous alternate sheets as above described but said openings are provided by said discontinuous sheets being sloped similarly as the continuous sheets and spacedly overlapped to allow the condensate from the vapors condensing above the discontinuous sheets, to flow downwardly along the underside of the proximate continuous sheet, the said continuous sheets being formed at their bottoms with reverse U bends to collect condensates from their undersides and keep the condensate separate from said liquid solution being evaporated, means to remove the condensed vapors from the U bends and means to remove concentrated solution, from which liquid has been evaporated, separately from the apparatus.

2. An apparatus according to claim 1 in which said sheets are made of metal.

3. An apparatus according to claim 1 in which said sheets are made of aluminum.

4. An apparatus according to claim 1 in which the said sheets are made of an elastomer.

5. An apparatus according to claim 1 in which said sheets are made of iron.

6. An apparatus according to claim 1 in which said sheets are made of polyethylene.

7. An apparatus according to claim 1 in which said sheets are made of polypropylene.

8. An apparatus according to claim 1 in which said sheets are made of polyester.

9. An apparatus according to claim 1 in which said solid particles are made of stone.

10. An apparatus according to claim 1 in which said discontinuous sloping sheets, that are between said continuous alternate sheets on which liquid is circulated and evaporated and which prevent the flow of condensate back into the liquid from which it has been evaporated, are arranged in an overlapping, spaced, shingle-type construction.

References Cited
UNITED STATES PATENTS

| | | | |
|---|---|---|---|
| 2,764,533 | 9/1956 | Oetjen et al. | 202—173 X |
| 2,863,808 | 12/1958 | Markels, Jr. | 202—158 |
| 2,946,726 | 7/1960 | Markels, Jr. | 202—158 |
| 3,129,145 | 4/1964 | Hassler | 202—174 |
| 3,129,146 | 4/1964 | Hassler | 202—172 X |

NORMAN YUDKOFF, Primary Examiner

J. SOFER, Assistant Examiner

U.S. Cl. X.R.

159—17 P, 13; 202—235; 203—11, 72, 73, 78, 80, 86, 89